United States Patent Office 3,689,374
Patented Sept. 5, 1972

3,689,374
PROCESS FOR SEPARATING HALOGENATED HYDROCARBONS BY EXTRACTIVE DISTILLATION
Donald O. Hanson, Bartlesville, Okla., assignor to
Phillips Petroleum Company
No Drawing. Filed May 10, 1971, Ser. No. 141,997
Int. Cl. C07c *17/38*
U.S. Cl. 203—64                                   2 Claims

ABSTRACT OF THE DISCLOSURE

A process for separating 1,1,2-trichlorotrifluoroethane from a first mixture consisting essentially of 1,1,2-trichlorotrifluoroethane and 1,2-dichloro-1,1-difluoroethane by adding one of a glycol or glycol ether to the first mixture to form a resultant second mixture and thereafter extractively distilling the second mixture in an extractive distillation zone to separate the 1,1,2-trichlorotrifluoroethane from the 1,2-dichloro-1,1-difluoroethane.

---

This invention relates to the separation of halogenated hydrocarbons from a first mixture and, more particularly, to a process for separating 1,1,2-trichlorotrifluoroethane from a mixture of 1,1,2-trichlorotrifluoroethane and 1,2-dichloro-1,1-difluoroethane.

In order to simplify the description of this process, 1,1,2-trichlorotrifluoroethane is hereafter referred to as 113 and 1,2-dichloro-1,1-difluoroethane is hereafter referred to as 132B.

In various hydrocarbon processes known in the art, mixtures of 113 and 132B are formed. It sometimes then becomes advantageous to separate the halogenated hydrocarbons of the mixture for recovering the valuable constituents or for further processing. An example source of the 113–132B first mixture is formed as a product of the electrochemical fluorination of ethylene dichloride. The process of electrochemical fluorination of ethylene dichloride is known in the art and is not a part of this application and it should be understood that the halogenated hydrocarbons separation process of this invention can be utilized without regard to the process by which the halogenated hydrocarbons were mixed to form the first mixture.

In their separated and pure state, the constituents of the first mixtures have boiling points and relative volatilities at atmospheric pressure as follows:

| Constituent | Boiling point, °C. | Relative volatility, 113/132B |
|---|---|---|
| 113 | 47.6 | 1.01 |
| 132B | 46.8 | |

The above tabulation indicates that it is next to impossible to separate 113 and 132B by ordinary distillation because of the close boiling points and attendant low value of relative volatility. Value of the relative volatility must generally be 1.1 or higher before a separation by ordinary distillation is economical in a commercial operation. When the relative volatility drops much below 1.1, industry generally resorts to extractive or azeotropic distillation by which means extraneous agents are added to the system to be separated to effect an increase in the relative volatility.

To illustrate that methyl Carbitol is an effective agent for increasing the volatility of 113 relative to 132B by an extractive distillation process, mixtures of 113 and 132B containing substantial amounts of methyl Carbitol were heated to 175° F. under various pressures and the compositions of the resultant vapors and liquid phases measured. The results are as follows:

| | Mixture No. 1, temperature=175° F. | | | |
|---|---|---|---|---|
| | Liquid phase composition, mole fraction | | | Relative volatility, 113/132B |
| Pressure, p.s.i.a.: | 113 | 132B | M.C. | |
| 14.95 | 0.0588 | 0.149 | 0.792 | 3.20 |
| 16.05 | 0.0644 | 0.163 | 0.773 | 3.05 |
| 22.20 | 0.0970 | 0.242 | 0.661 | 2.54 |

| | Mixture No. 2, temperature=175° F. | | | |
|---|---|---|---|---|
| 14.3 | 0.0552 | 0.140 | 0.805 | 3.10 |
| 21.4 | 0.097 | 0.241 | 0.662 | 2.51 |
| 26.0 | 0.127 | 0.315 | 0.558 | 2.23 |
| 28.35 | 0.146 | 0.362 | 0.492 | 2.03 |

The relative volatilities were calculated from the concentrations of 113 and 132B in the liquid and vapor phases according to accepted procedures. The relative volatilities are high enough for separation by extractive distillation. The concentration of methyl Carbitol in the liquid phase is also seen to be relatively low, only about 50 mol percent of the total liquid in Mixture No. 2 at 28.35 p.s.i.a. pressure. This means a relatively low solvent circulation rate in the commercial extractive distillation column and hence utilizes reduced time, labor and power.

The commercial extractive distillation column is operated according to conventional procedures, i.e., the 113–132B mixture is fed to the center of a bubble-tray equipped fractionator containing approximately 50 trays. Methyl Carbitol is fed to the top of the fractionator and passes downward as a liquid through the trays to the bottom. The 113 being more volatile than 132B in the presence of the solvent passes in the relatively pure state from the top of the fractionator where it is condensed, part returned as reflux and the remainder taken as high purity 113 product. The bottoms stream from the fractionator consists of a mixture of methyl Carbitol and 132B. This mixture is passed to a second fractionator or stripper for separation of 132B and methyl Carbitol, an easy separation because of the wide separation in boiling points. The recovered methyl Carbitol is recycled to the top of the extractive distillation column. The 132B is recovered as high purity product. The extractive distillation column operates at about 25 p.s.i.a. pressure and a temperature of between about 175 and 200° F. The stripper operates at about 50 p.s.i.a. with a bottoms temperature of about 400° F.

While methyl Carbitol, also known as diethylene glycol monomethyl ether, is the preferred solvent, other glycols and glycol ethers, also referred to as polyalkylene glycols, may also be used. Alkylene glycols and polyoxy-polyalkylene glycols which are an effective class of solvents include the di-, tri-, and tetra-oxy-ethylene glycols, particularly oxy-diethylene glycol, mono-, di-, and tri-oxy-propylene glycols and mono-, di-, and tri-oxy-butylene glycols; certain glycol ethers, such as the Cellosolve series of compounds (defined structurally as the alkyl ethers of ethylene glycol), including methyl-, ethyl-, propyl-, and butyl-Cellosolve; the Carbitols (defined structurally as the alkyl ethers of di-ethylene glycol), such as methyl-, ethyl-, propyl-, and butyl-Carbitols, for example, wherein the alkyl group contains 1–5 carbon atoms.

Other modifications and alterations of this invention will become apparent to those skilled in the art from the foregoing discussion and examples and it should be understood that this invention is not to be unduly limited thereto.

What is claimed is:
1. A process for separating 1,1,2-trichlorotrifluoroethane from a first mixture of 1,1,2-trichlorotrifluoroethane and 1,2-dichloro-1,1-difluoroethane, comprising:
   adding one of a glycol or glycol ether to the first mixture for forming a resulting second mixture; and
   separating 1,1,2-trichlorotrifluoroethane from the 1,2-dichloro-1,1-difluoroethane of said second mixture by extractively distilling the second mixture in an extractive distillation zone.
2. A process, as set forth in claim 1, wherein the material added to the first mixture to form the resultant second mixture is diethylene glycol monomethyl ether.

References Cited

UNITED STATES PATENTS

| | | | |
|---|---|---|---|
| 2,999,885 | 9/1961 | Heberling | 260—653 |
| 3,113,079 | 12/1963 | Bergerin et al. | 203—64 |
| 3,551,307 | 12/1970 | Gray | 204—59 |
| 3,620,941 | 11/1971 | Rehlen | 204—59 |

WILBUR L. BASCOMB, Jr., Primary Examiner

U.S. Cl. X.R.

204—59 R; 260—653 R; 55—71